(12) United States Patent
Keereman et al.

(10) Patent No.: US 6,258,399 B1
(45) Date of Patent: Jul. 10, 2001

(54) FOOD COMPOSITION FOR YOUNG CHICKS

(75) Inventors: Patrick Keereman, Zwalm; Germain Vermeersch, De Pinte, both of (BE)

(73) Assignee: VITAMEX, Drongen (BE)

( * ) Notice: Subject to any disclaimer, the term of this patent is extended or adjusted under 35 U.S.C. 154(b) by 0 days.

(21) Appl. No.: 09/486,818

(22) PCT Filed: Sep. 1, 1998

(86) PCT No.: PCT/BE98/00127

§ 371 Date: Mar. 2, 2000

§ 102(e) Date: Mar. 2, 2000

(87) PCT Pub. No.: WO99/11145

PCT Pub. Date: Mar. 11, 1999

(30) Foreign Application Priority Data

Sep. 3, 1997 (WO) .................................. PCT/BE9700100

(51) Int. Cl.[7] ....................................................... A23K 1/18
(52) U.S. Cl. ........................... 426/635; 426/656; 426/658; 426/807
(58) Field of Search .................................. 426/635, 807, 426/656, 658

(56) References Cited

FOREIGN PATENT DOCUMENTS

| 195 29 861 | 2/1997 | (DE) . |
| 0 171 026 | 2/1986 | (EP) . |
| 0 579 901 | 1/1994 | (EP) . |
| 0 680 945 | 11/1995 | (EP) . |

OTHER PUBLICATIONS

Database WPI, Section CH, Week 9640, Derwent Publications, Ltd., London, GB, XP002089117 & RU 2050793, Dec. 27, 1995.
Database WPI, Section CH, Week 9303, Derwent Publications, Ltd., London, GB, XP002089118 & SU, 1713540, Feb. 23, 1992.
Database WPI, Section CH, Week 9233, Derwent Publications, Ltd., London, GB, XP002089119 & SU 1678284, Sep. 23, 1991.
Patent Abstracts of Japan, vol. 018, No. 571, Nov. 2, 1994 & JP 06 209719, Aug. 2, 1994.
Database WPI, Section CH, Week 9443, Derwent Publications Ltd., London, GB, XP002089120 & JP 06271473, Sep. 27, 1994.
Database WPI, Section CH, Week 9405, Derwent Publications, Ltd., London, GB, XP002089121 & SU 1787010, Jan. 7, 1993.

*Primary Examiner*—Chhaya D. Sayala
(74) *Attorney, Agent, or Firm*—Sughrue, Mion, Zinn, Macpeak & Seas, PLLC

(57) ABSTRACT

This invention relates to a food composition for young chicks, which food composition contains a monosaccharide, a disaccharide, an oligosaccharide or a mixture thereof, preferably in an amount of 2.5–25 percent by weight with respect to the total weight of the composition. The food composition is especially provided for feeding young chicks during the first days after hatching. Thereafter, they can be fed with the usual food for chickens.

10 Claims, No Drawings

FOOD COMPOSITION FOR YOUNG CHICKS

The present invention relates to a food composition for young chicks, in particular day old chicks.

In A. K. Zubair et al, World's Poultry Science Journal, Vol. 52, 1996, pp. 189–201, it is described that improvements of the quality of the nutrition of broilers have provided the possibility of increasing their growth rate in modern broiler strains. The increased growth is reflected in either an increased weight of the grown up chicken, or in a reduction of the period of time required for obtaining a grown up chicken. The growth rate of a young chick has been found to vary with its age. Thereby, the most dramatic growth rate increase is manifested primarily in the first four weeks after hatching, when the young chick has to change from endogenous nutrition through the yolk sac of the egg, to exogenous nutrition. An increased growth rate in these first four weeks has been found to involve an increased weight of grown up broilers at the age of 42 days or more, that are ready for consumption. Namely, a correlation seems to exist between the weight of a young bird at an age of 6 days and the weight of the corresponding grown up chicken after 4 to 6 weeks, when it is ready for consumption.

In "The handbook of poultry farming", Beekbergen, The Netherlands, 1994, p. 181–183, it is disclosed that, in order to achieve an increased growth rate, the nutrition of young chicks on the first days after hatching has to be seriously reduced. Thereto, the young chicks do not receive any or hardly any food in the first days of their life. It is namely believed that after chicks have been deprived of nutrition during their first days of life, they show compensatory growth when they receive food in a subsequent stage. Compensatory growth can be defined as an abnormally rapid growth relative to the age of the animal.

It is also believed that young chicks, should be deprived of food until they have resorbed their yolk sac in order to speed up its resorption, and that exogenous food may only be supplied after resorption of the yolk sac. It was namely believed that only the young bird starts growing only after resorption of the yolk sac.

This way of feeding young chicks however has the disadvantage of still involving an undesired mortality amongst the chicks, especially during the first week of their life, and thus a loss of production efficiency.

In JP-A-0 6209719 it is disclosed to feed single-stomach domestic animals such as chickens, during the period from the newborn stage through the weaning stage with a feed composition so as to prevent diarrhoea glutamine-containing and promoting the growth. The feed composition further comprises corn, wheat flour which are generally known to contain small amounts of maltose. There is however no teaching in JP-A-06209719 that maltose would have any growth enhancing effect.

It is the aim of the present invention to provide a food composition with which the above described undesired mortality of young chicks can be reduced.

This is achieved according to the invention in that the food composition for day old chicks contains an amount of a monosaccharide, a disaccharide, oligosaccharide or a mixture thereof.

The food composition of the present invention is especially meant for feeding young chicks during the first four to five days after hatching. Thereafter, they can switch to the usual food for chickens.

The monosaccharide, disaccharide, oligosaccha-ride or mixture thereof may for example be supplied as a glucose syrup, maltodextrins, in the liquid phase or in the dehydrated solid state. The disaccharide may for example be α-maltose, β-maltose, cellobiose, or a mixture thereof, or any other disaccharide generally known to the man skilled in the art. Glucose syrup mostly contains mono-, di-, tri- as well as oligosaccharides and maltodextrins. The saccharides of this invention are meant to include those saccharides that can be metabolised by the young chick, and used for the development and growth of its body. The saccharides of this invention are not meant to include those saccharides. that can only be absorbed by the intestinal flora and used by these micro organisms for their own development.

By feeding day old chicks on their first hours and during the first days after hatching with the food composition of the present invention, the mortality degree of the chicks during the first 4–6 weeks of their life can be reduced with about 40%. After the young chicks have been fed with the food composition of the present invention during the first four to five days of their life, they are ready to receive and capable of digesting the commonly used food that is supplied to chickens to grow them in the appropriate way.

It has namely been found that with the food composition of the present invention, the resorption of the yolk sac can be accelerated. Since the growth of the young chick only starts after the yolk sac has been resorbed, by feeding day old chicks with the food composition of the present invention an earlier initiation of the growth can be obtained. It is thus not necessary anymore to await the resorption of the yolk sac before feeding young chicks with exogenous food. The earlier start of the growth of the young chicks is moreover reflected in an increased weight of the grown up chicken. Also, the enhanced resorption of the yolk sac is involves a decrease of the mortality of the chicks due to infection of the yolk sac during the first days of their life.

By feeding day old chicks with the food composition of the present invention the transition from the rather simple nutrient source of the yolk sac, mainly fat, to the much more complex usual exogenous food is facilitated. The intestinal track of the day old chick namely appears to be capable of splitting disaccharides to monosaccharides and of splitting oligosaccharides to disaccharides, which than in turn may be split to the corresponding monosaccharides. The wall of the intestinal tract of the young chick is capable of absorbing the monosaccharides, which involves an earlier onset of the carbohydrate digestion mechanism, an earlier start of the functioning of the intestinal tract and thus a facilitated and earlier start of the functioning of the metabolism of the young chick.

Through the early activation of the carbohydrate metabolism, the production of growth stimulating hormones by the hypophysis, and thus the growth of the young chicks, is stimulated at an earlier stage. This results in an advanced onset of the growth of the young birds, which in turn is reflected in an increased weight of the grown up chickens. This is in contrast with the generally accepted theory, that a young chick should be deprived from nutrition in the first days of its life in order to enable it of exhibiting compensatory growth.

The advanced start of the carbohydrate digestion mechanism indirectly involves an advanced development of the immune response system of the young chicks. In that way the formation of leukocytes is stimulated, which results in an improved immune response system, and a decreased mortality degree amongst the young chicks. When depriving the one day old chick from food, as is done according to the state of the art, the immunity of the young chick after hatching is limited to the maternal immunity, which is often insufficient for protecting the young chick from diseases.

Furthermore, by feeding the young chicks immediately after hatching with the food composition of the present invention, the growth rate of the young chicks can be increased. Whereas according to the state of the art after 14 days, approximately 50% of the broilers have a body weight of between 365 and 390 gram, this can be increased to a body weight of between 440 and 465 gram by feeding the day old chicks with the food composition of the present invention, during the first four to five days of their life. Thereafter, they can be fed with the usual food for chickens. According to the invention the number averaged weight of the chickens at an age of 14 days can be increased with 15%, as compared with the state of the art. This increased weight of the young chicks after 14 days is reflected in an increased number averaged weight of the grown up broilers at an age of 42 days. At an age of 42 days, approximately 60% of the broilers have a body weight of between 2300 and 2500 gram, whereas according to the state of the art, this is only between 2100 and 2300 gram.

The mono-, di- and oligosaccharide or mixture thereof is preferably present in an amount of 2.5 to 25 percent, more preferably 5 to 15 percent, by weight with respect to the total weight of the composition. In this range an optimal increase of the growth rate of the young chick can be achieved.

The food composition of the present invention preferably comprises hydrolysed and/or autolysed proteins, preferably in an amount of 0.05 to 5 percent, more preferably 0.05 to 0.5 percent by weight with respect to the total weight of the composition.

Hydrolysed or autolysed proteins are oligopeptides of which approximately 40% has a molecular weight of 180–5000, and maximum 10% has a molecular weight above 17000. These proteins are in fact the decomposition products of the polypeptides that are present in egg white and meat.

By supplying such hydrolysed or autolysed proteins to the a day old chick, the chick is rendered capable of digesting exogenously supplied proteins, already shortly after hatching. It has namely been found that by supplying such proteins to the day old chick, the synthesis in the pancreas of the enzymes, responsible for the decomposition of proteins supplied through the food, to oligopeptides, dipeptides and/or amino acids, is stimulated. In that way an advanced production of an essential building block of the muscles and an advanced onset of the growth of the young chick can be obtained.

This is in contrast to the generally accepted idea that the young chicks have a limited capacity of digesting exogenous food, because of their still undeveloped digestion metabolism. With the commonly used method of limited nutrition, the enzymes for decomposing proteins are not synthesised but in a later stage, so that the young chick can only get a limited protein supply upon digestion of the yolk sac during the first days of its life.

The food composition of the present invention, preferably comprises taurin, preferably in an amount of 0.05 to 5 percent, more preferably 0.05 to 0.5 percent by weight with respect to the total weight of the composition. Taurin is an amino acid like substance which corresponds to the chemical formula $H_2NCH_2CH_2SO_3H$. Taurin has been found capable of accelerating the resorption of the yolk sac after hatching. This is again in contrast to the generally accepted idea that the young chick should be deprived from nutrition in order to promote the resorption of the yolk sac. A quick resorption of the yolk sac is of importance, so as to prevent inflammation thereof and prevent the young bird from deceasing.

Preferably, the food composition of the present invention also comprises 0.5 to 5 percent by weight with respect to the total weight of the composition of polyunsaturated essential fatty acids. Essential fatty acids are the precursors of the prostaglandines responsible for cell multiplication, and cannot be synthesised by the organism. By supplying them through the food of the young chick immediately after hatching, the development of muscles and fat in the young bird can be stimulated in an early stage which is reflected in an increased weight of the grown up broilers.

Essential fatty acids are mostly polyunsaturated fatty acids. Suitable examples include ω-3 and ω-6 unsaturated fatty acids, for example linoleic acid (C18:2ω6), eicosapentaenoic acid (C20:5ω3) and docosahexanoic acid (C22:6ω3).

If so desired, also carnitin may be added to the food composition of the present invention so as to get the fat metabolism going in an early stage. Carnitin is a vitamine like substance, which corresponds to the formula:

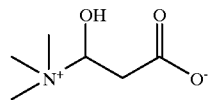

Carnitin has been found to facilitate the metabolisation of fats. One day old chicks, shortly after hatching, obtain the necessary energy for staying alive from the digestion of the fat present in the yolk sac. Since carnitin is only synthesised by the young chick after a couple of days, the chick will in the first days of its life only capable of metabolising fat at a lower rate. By adding carnitin to the food composition from the beginning, it has been found that not only the start of the fat metabolism can be moved up, but also that the weight gain of the young chicks can be stimulated.

If so desired, the food composition of the present invention may further comprise free amino acids, preferably methionin, glycin and/or glutamic acid or salts thereof. By adding such amino acids to the food, the protein metabolism is got working in a more efficient way at an earlier stage and the growth of the young chick can be further stimulated.

The presence of methionin, glutamic acid and glycine is essential in that part of the protein metabolism that is responsible for the synthesis of the proteins for the development of the muscles. Normally, these amino acids are obtained from the digestion of food containing proteins, which proteins are decomposed to give oligopeptides and amino acids. From these compounds, new proteins are synthesised by the chick, to form the muscles and grow the chicken.

Methionin is an essential amino acid that corresponds to the chemical formula $CH_3SCH_2CH_2CH(NH_2)COOH$.

Methionin is an essential amino acid for young chicks, which functions as a methyl donor group for the depoisoning processes in the liver. Methionin may also play a role in the development of the immune system of the young chick.

Glycin is an essential amino acid for young chickens in the first two weeks of their life, which can easily be transformed to give the higher amino acids, that form the building blocks of the muscles. By adding glycin to the food, an advanced onset of the growth of the young birds can be obtained. Glycin corresponds to the chemical formula $CH_2(NH_2)COOH$.

Glutamic acid is a non essential amino acid that can be easily transformed to other, essential amino acids. By adding the glutamic acid to the food, there is no need for the young bird to synthesise it, which may result in an advanced synthesis of muscles. Glutamic acid corresponds to the chemical formula $$HOOCCH_2CH_2CH(NH_2)COOH.$$

The food composition of the present invention further preferably comprises a fat emulsifying agent, preferably in an amount of 0.5 to 10 percent, more preferably 1 to 5 percent, by weight with respect to the total weight of the composition. The fat emulsifying agent is preferably native lecithin. The suppletion of such a fat emulgator, renders the day old chick capable of emulgating, and thus digesting, fat. Normally, gall salts are responsible for the emulgation of fat. Since however, in the day old chicks, these gall salts are deconjugated by the micro-organisms of the intestine to a certain extent, the young chick is hardly capable of digesting fat. By supplying a fat emulgator, the fat digestion mechanism can be stimulated, resulting in an earlier start of the young bird's growth. With the restricted nutrition known from the state of the art, the fat supplied to the young bird through its food cannot be digested, or only in very limited amount, thus limiting the growth of the young bird.

The food composition of the present invention may further comprise the usual minerals (Ca, P, Na), salts and food ingredients, for example corn, soya, vitamins and trace elements.

The food composition of the present invention will mostly be supplied in the solid state, for example as a powder, in pellets or crumbs. It may be supplied as such or mixed with conventional nutrients such as for example soya, corn etc.

The invention is further illustrated by means of the following examples.

EXAMPLE 1

TABLE 1

Composition of conventional food

| | Starter | Finisher |
|---|---|---|
| ME poultry, kcal | 3050 | 3200 |
| Crude Protein, % | 23.0 | 22.0 |
| Crude fat, % | 6.0 | 11.0 |
| Lysine, % | 1.25 | 1.15 |
| Methionine + Cystine, % | 0.95 | 0.85 |
| Vitamine A, IU/kg | 12.500 | 10.000 |
| Vitamine E, mg/kg | 30 | 30 |

TABLE 2

Food composition of the present invention

| Component | Concentration (wt. %) |
|---|---|
| Corn | 32 |
| Soya | 50 |
| Glucose syrup dehydrated | 10 |
| Lecithin mixture | 2 |
| Amino acids methionin | 0.25 |
| Amino acid glycin | 0.1 |
| Amino acids glutamic acid | 0.1 |
| Taurin | 0.1 |
| Carnitin | 0.02 |
| Poly unsaturated fatty acid mixture | 2 |
| Rest | 3.41 |

EXAMPLE 2

TABLE 3

Comparison of food conversion ration, the weight evolution of young birds as a function of time, and the yolk sac resorption after feeding with the food composition known from the art (control) and feeding with the food composition of this invention (Galito).

| | Control | Galito ™ | Difference |
|---|---|---|---|
| Day 8 | 0.98 | 0.95 | −0.03 |
| Day 14 | 1.26 | 1.10 | −0.16 |
| Day 28 | 1.80 | 1.43 | −0.17 |
| Day 42 | 1.84 | 1.70 | −0.14 |

The food conversion ratio of the group of chicks fed with Galito™, as described in table 2, is lower than the control group, which has been fed with the conventional food composition, as described in table 1. On day 42 the difference is −0.14 or about 7.5 %.

Resorption of the Yolk Sac 20 birds were slaughtered on day 2 and day 5. The body weight and the weight of remaining yolk sac were recorded. The weight of the remaining yolk sac was related to the body weight. The results are summarised in table 4 given below.

TABLE 4

| | Control group | | Galito ™-group | |
|---|---|---|---|---|
| | body weight, g | yolk sac (1) | body weight, g | Yolk sac (1) |
| Day 2 | 50.8 | 4.27(*) | 52.9 | 2.74(*) |
| Day 5 | 72.8 | 0.77 | 87.8 | 0.69 |

(1) as a percentage of bodyweight.
(*) Figures followed by (*) are significantiy different P < 0.05.

As can be seen from table 4, the weight of the remaining yolk sac on day 2 is 4.27% of the body weight for the control group fed with the conventional food composition, and only 2.74% for the group fed with Galito™, which is a significant difference (P<0.05). At day 5, the difference of the weight of the yolk sac is much smaller.

From these results it can be concluded that by feeding day old chicks with 50 g of Galito™ as the first food, the resorption of the yolk sac during the first days can be stimulated, and the growth rate of the young chicks can be increased (up to 10%).

EXAMPLE 3

TABLE 5

Body weight of young chicks as a function of time, after feeding with conventional food (control) and the food composition of the present invention (Galito).

| | Control | Galito ™ | Difference |
|---|---|---|---|
| Day 0 | 44 | 44 | 0 |
| Day 2 | 63 | 63 | 0 |
| Day 5 | 111 | 123 | 12 |
| Day 8 | 186 | 210 | 24(*) |
| Day 14 | 387 | 452 | 55(*) |
| Day 28 | 1182 | 1369 | 187(*) |
| Day 42 | 2144 | 2363 | 219(*) |

(*): significant difference (P < 0.05)

From table 5, the effect can be seen on the body weight gain of feeding day old chicks during a period of about 4 days with about 50 gram per day of the food composition of the present invention as a first food. Thereafter the young birds received the conventional food described above in table 1. From table 5 it can be seen that chicks that have been fed with the food composition of the present invention show an increased growth rate, as compared with those chicks that have been fed with the conventional food. Especially from day 8 on, a significantly higher growth rate is observed. At day 42 the difference is 219 gram or about 10%.

EXAMPLE 4

TABLE 6

| | Food intake, g/bird: | | |
|---|---|---|---|
| | Control | Galito ™ | Difference |
| Day 8 | 182 | 200 | 18 |
| Day 14 | 487 | 497 | 10 |
| Day 28 | 1892 | 1957 | 65 |
| Day 42 | 3945 | 4018 | 73 |

Table 6 shows the food intake by the young chicks as a function of time, when fed with the conventional food composition or with the food composition of the present invention. It appears that food intake is not altered by feeding with Galito™. At day 42 the difference is only 73 g or about 2%.

What is claimed is:

1. A solid food composition suitable for young chicks, characterised in that the food composition contains 2.5–25 percent by weight of maltose.

2. The solid food composition as claimed in claim 1, characterised in that it contains glucose syrup as a source of maltose.

3. The solid food composition as claimed in claim 1 or 2, characterised in that said food composition contains hydrolysed and/or autolysed proteins, in an amount of 0.05 to 5 percent by weight with respect to the total weight of the composition.

4. The solid food composition as claimed in 3, characterised in that said food composition contains taurine in an amount of 0.05 to 5 percent by weight with respect to the total weight of the composition.

5. The solid food composition as claimed in 4, characterised in that said composition further comprises a fat emulsifying agent, in an amount of 0.05 to 5 percent by weight with respect to the total weight of the composition.

6. The solid food composition as claimed in claim 5, characterised in that said emulsifying agent is lecithin.

7. The solid food composition as claimed in 6, characterised in that said composition comprises at least one of the amino acids chosen from the group of methionine, glycine, or glutamic acid.

8. The solid food composition as claimed in 7, characterised in that said composition further comprises 0.5 to 5 percent by weight with respect to the total weight of the composition of one or more polyunsaturated fatty acids.

9. The solid food composition as claimed in 8, characterised in that said composition comprises carnitine.

10. The solid food composition as claimed in 9, characterised in that it further comprises one or more of the conventional nutrients chosen from the group of corn, and soya.

* * * * *